United States Patent [19]
Gross et al.

[11] Patent Number: 5,542,836
[45] Date of Patent: Aug. 6, 1996

[54] DEVICE FOR EXTRUDING AND SMOOTHING PLASTIC FILMS

[75] Inventors: Heinz Gross, Ringstrasse 137, D-64380 Rossdorf; Michael Meier-Kaiser, Pfungstadt, both of Germany

[73] Assignee: Heinz Gross, Rossdorf, Germany

[21] Appl. No.: 356,344

[22] PCT Filed: Jun. 23, 1993

[86] PCT No.: PCT/DE93/00540

§ 371 Date: Feb. 2, 1995

§ 102(e) Date: Feb. 2, 1995

[87] PCT Pub. No.: WO94/00285

PCT Pub. Date: Jan. 6, 1994

[30] Foreign Application Priority Data

Jun. 25, 1992 [DE] Germany .................. 42 20 839.4

[51] Int. Cl.⁶ .................................................. B29C 59/04
[52] U.S. Cl. ..................... 425/141; 425/363; 425/367; 425/385; 425/461; 264/210.1
[58] Field of Search ............................. 425/363, 367, 425/404, 461, 141, 385; 264/210.1

[56]     References Cited

U.S. PATENT DOCUMENTS 3,758,657  9/1973  Menzin et al. .
4,354,814  10/1982 Grimminger et al. ............. 425/367
4,372,736  2/1983  Gooch et al. .
4,477,407  10/1984 Hetherington et al. ........... 264/210.1
4,639,346  1/1987  Pav et al. .......................... 425/367
4,810,179  3/1989  Cavanagh .
4,858,139  8/1989  Wirtz ................................ 425/367
5,011,395  4/1991  Kawamata ......................... 425/363
5,094,790  3/1992  Halter ............................... 264/210.1
5,167,894  12/1992 Baumgarten ....................... 425/367
5,257,923  11/1993  Kagawa ............................ 425/367
5,263,840  11/1993  Heitmann et al. ................. 425/367

FOREIGN PATENT DOCUMENTS 0410852  1/1991  European Pat. Off. .
0429161  5/1991  European Pat. Off. .
2673141  8/1992  France .

*Primary Examiner*—Khanh P. Nguyen
*Attorney, Agent, or Firm*—Burns, Doane, Swecker, Mathis, L.L.P.

[57]     ABSTRACT

A plastic film is formed by passing a web of extruded thermoplastic material through a slit formed between a pair of smoothing rolls. One of the rolls is biased toward the other roll by a yieldable biasing mechanism to accommodate variations in thickness of the web.

8 Claims, 2 Drawing Sheets

DEVICE FOR EXTRUDING AND SMOOTHING PLASTIC FILMS

DESCRIPTION

This invention relates to apparatus for the extrusion and smoothing of plastic films.

BACKGROUND ART

Apparatus consisting of an extruder for extruding a thermoplastic material, a sheet die connected thereto and a smoothing roll mechanism to receive an extruded web between at least two smoothing rolls forming an intermediary slit is commonly used for the extrusion of plastic films and their smoothing on both sides. To ensure a uniform thickness throughout the plastic web when plastic sheets and plastic films of more than 0.5 mm in thickness are produced, it is recommendable to keep a small "stock" of the plastic melt in the shape of a bead in front of the intermediary slit being continually pressed out. By this, the intermediary slit is kept fully charged all the time. The web surfaces formed are already completely smooth while cooling and freezing in the intermediary slit, whereas the core of the web does not freeze before it has passed the intermediary slit and with progressive cooling. By controlling the number of revolutions of the extruder roll mechanism one can ensure that the bead is retained at a substantially constant size for a longer time. Thin film webs, however, already freeze throughout their complete thickness in the narrowest area of the intermediary slit and are no longer thermoplastically mouldable. The bead of moulding material in front of the intermediary slit has to be kept to a minimum size. Smoothing of the film surface is only achievable by exerting high clamping forces which lead to a deflection of the rolls. While this deflection can be equalized in advance by accordingly knobbed rolls, such equalization will only be effective at one special operating point. Outside this operating point differences in the slit width between centre and marginal areas are inevitable, entailing corresponding differences in the resulting film thickness.

Increases in the bead thickness induce extremely high pressures at the slit. Variations in the slit width and the pressures appearing there are caused by inevitable deviations in the roundness of the rolls. Local thickening in the extruded web caused by the extrusion process may lead to such high contact pressures locally that the roll surfaces are permanently deformed. To avoid these problems, rubber rolls partly coated with a lacquer finish are used as counter rolls of the steel smoothing roll. The lacquer finish being very sensitive, however, these rolls are normally of short longevity.

Controlling of extrusion and smoothing of thin plastic films thus requires a careful adherence to constant production conditions and especially the use of film dies having adjustable outlet lips, socalled "flex lips" Nevertheless there are often deviations or troubles in practice which generally cause damages to the roll surface resulting from extreme pressures in the smoothing slit.

DISCLOSURE OF THE INVENTION

The aim of the present invention is to improve apparatus for the extrusion of plastic films comprising A) an extruder to extrude thermoplastic materials,
B) a film die connected thereto,
C) a smoothing roll mechanism consisting of a least two smoothing rolls forming an intermediary slit to receive an extruded film web in such a way that it is possible to produce smoothed films by avoiding high pressures at the slit and the problems involved therewith.

According to the invention, the aforesaid aim is met by apparatus of the known kind including features A, B, C in which at least one roll of a smoothing mechanism is arranged in a movable and elastic way perpendicularly to the contact plane of the intermediary slit, thus modifying the distance between the axes of the two rolls; the pressure at the slit varying within a range of ±20% independent of a displacement of the axes; the pressure at the slit being set to a substantially constant size; the pressure at the slit P1 being of a value of 100N/cm relative to the slit length; and the pressure at the slit being adjustable. Thus, a line force at which the rolls of a smoothing mechanism run against each other in the intermediary slit is limited to a size which does no longer cause damage to the roll surface.

It was noticed that with the extremely improved technical possibilities of reducing thickness fluctuations as emerged from an extrusion nozzle over the width of a melt web as presently in use, it is no longer necessary to eliminate thickness fluctuations in the smoothing mechanism by the aid of high closing forces of the rolls. The design using high line forces in the smoothing slit which is prior art gets at its limits if it is a question of extremely thin films. As experiments have shown, a melt web which enters the smoothing slit with a nearly constant thickness does not require high line forces for a perfect smoothing of its surfaces. This means that rolls of a diameter of <200 mm can be used for smoothing films, which, as the experiments have shown, is particularly advantageous when smoothing extremely thin melt webs, as small roll diameters allow a close approach to the ideal of a linear contact between melt web and at least one smoothing roll in the narrowest point of the smoothing slit.

It is therefore unnecessary to design a smoothing roll mechanism to withstand high line forces. Remaining variations in thickness are equalized by evading movements of the rolls forming the intermediary slit, as are deviations in the truth of roll rotation. The pressure at the slit being limited to a maximum value and being preferably more or less constant, the smoothing effect obtained is the same irrespective of the position of the movable roll's axis.

BRIEF DESCRIPTION OF THE DRAWINGS

Following a description of the embodiments of the invention with reference to FIGS. 1 and 2.

EMBODIMENTS OF THE INVENTION

Figure 1:
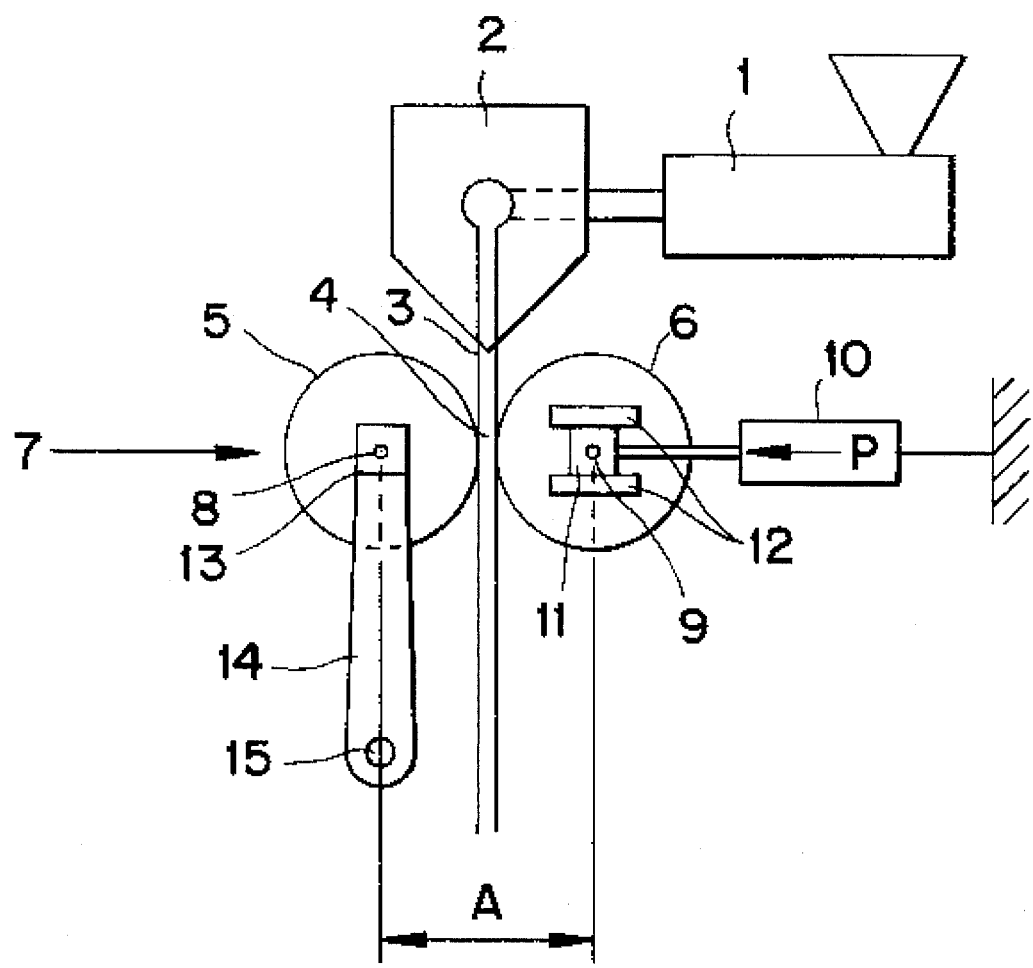
FIG. 1 is a schematic view of a preferred embodiment of the extrusion line according to the invention.

In a film extrusion line in accordance with FIG. 1, a conventional extruder 1 is used to melt a thermoplastic material. The plastic melt is fed into a film die 2 connected thereto. The extruded and plasticized melt web enters an intermediary slit or nip 4 between smoothing rolls 5 and 6 of a smoothing mechanism 7.

For an absolute minimization of thickness variations over the width of the melt web entering the intermediary slit, which is of essential importance for the execution of the process, the melt stream emerging from a nozzle should be controlled over its width by measuring the bead size as e.g. described in the Greece patent No. 85.420 or in EP 0 429 161 or by measuring the birefringence (refer to Gbm 92 12 406.2).

At least one but preferably each of the rolls of the smoothing mechanism 7 is driven at a circumferential speed corresponding to the desired production speed of the film web. The smoothing rolls 5 and 6 may have a mirrorfinish to create a glossy film surface. Alternatively, they may be of a satinfinished or structured surface to produce films with a reciprocal surface structure. For the purposes of this invention, the term "smoothing" includes any conversion of an uncontrolled disturbance of the web surface into any desired surface structure. By a coolant passing into and out of the rolls through their hollow axes, the rolls are tempered to a temperature below the softening temperature of the thermoplastic material.

In the extrusion line according to the present invention, the clear aperture of the intermediary slit 4 is automatically set by the thickness of the incoming film web. It is normally ranging between 10 and 500 micrometers. While the axes 8, 9 of rolls 5, 6 in conventional smoothing mechanisms rigidly rest on the machine frame with a fixed setting, the apparatus according to the present invention includes a smoothing mechanism in which at least one roll 6 is arranged in a movable way perpendicularly to the contact plane of the intermediary slit so that it can automatically adjust to the thickness of the incoming film web. Its displacement will cause a change in the distance A in relation to the axis of the other roll 5.

An "elastic movement" for the purposes of this invention means that the roll returns to its original position after the moving force which might be a thickening of the web caused by an interference has disappeared or passed through the intermediary slit resp., thus keeping permanent contact with the web. The term "elastic" does not necessarily mean that the pressure at the slit will increase with rising extent of displacement. Unless a thick foreign substance happens to be drawn into the intermediary slit, operational movements of the axis do not exceed fractions of a millimeter. Even if the pressure at the slit is generated by an elastic force, thus inducing the clamping force to increase with increasing movement corresponding to the elasticity constant, it can be considered as almost constant in case of operational displacements.

A spring of a sufficient length is to guarantee that the pressure at the slit is kept within a variation range of ±20% preferably ±5%, particularly ±2% in relation to the average value, unless the displacement of the axis exceeds 0.5 mm. Normally, the pressure at the slit is set to a value remaining almost constant. A pressure P at the slit ranging between 1 and 100N/cm is generally sufficient to ensure satisfactory smoothing on the one hand and exclude permanent alterations to the roll surfaces on the other hand. The pressure at the slit is preferably generated by means allowing the pressure to be set to any value desired within the above range.

The pressure admissible at the slit has to be adapted to the stiffness of the smoothing rolls. The deflection in the centre of the roll must in any case be within a range negligible in relation to the slit width or the film thickness. With a given pressure, the extent of deflection is dependent on the roll diameter and length as well as on the roll design and material. The necessary pressures at the slit being much lower than with conventional smoothing mechanisms, rolls of small diameters can be used and their bearings and the machine frame be of a less sturdy design. The width/diameter ratio is preferably between 5 and 20. The roll diameters should be <400 mm or, ideally <200 mm.

For the purposes of the present invention it is not absolutely necessary that the elastically arranged rolls are always moved concentrically towards the respective other rolls. When a thickening caused by an interference exclusively occurs on one side of the web width, only the roller bearing at this very point needs to be displaced. Thus, selfaligning roller bearings would be suitable as roller bearings for instance. If desired, the roller bearings could be linked in a way that they are moved concentrically.

If it is only a question of axle shifting as a result of fluctuations in the truth of rotation of a smoothing roll, the apparatus according to the present invention allows a better uniformity of film thickness and film quality compared to devices having rigidly supported axes. Axle shiftings resulting from different reasons like thickenings in the incoming web may lead to fault sections over the width of the web. The costs of the waste caused by this are much lower, however, than the costs incurred by an interruption of production and repair of a damaged roll surface.

The present invention embodies different mechanical devices. A slit pressure which remains perfectly constant irrespective of the axle position can be achieved by either loading the shaft bearings with a dead weight or generating the slit pressure by the net weight of one of the rolls.

Bearing blocks 11 in which the axis 9 of the movable smoothing roll 6 is resting may be mounted in a movable way on slide rails 12. What is important in this respect is that the movability must not cause high friction in order to eliminate undue slit pressures as a result of frictional forces. The bearing blocks 11 could slide on linear bearings for instance.

In another embodiment of the invention roller bearings 13 are located at the free ends of swing arms the other ends of which are attached to the machine frame by means of a hinge joint 15. Any movement of the swing arms 14 causes a change in the size of the intermediary slit 4. The hinge joint 15 can be replaced by a flat spring simultaneously creating the desired slit pressure.

Preferably, the pressure at the slit is generated by means of pressure means 10 directly acting on shaft bearings 11, 13 or swing arms 14. On possibly occuring axle shiftings during operation which normally do not exceed 0.1 mm the pressure created by the pressure means 10 shall preferably not vary by more than ±20%.

Suitable pressure means are for instance elastic elements with a sufficiently flat characteristic curve like spiral springs, flat springs, gas bulbs or constant weights which may be arranged on a lever arm, acting on swing arm 14 via the latter or engaging in the axle heads by means of traction ropes and via guide rollers. Such lifting or pressure means are preferably designed in a way to allow adjustment to different slit pressures, which can be easily realized by providing an initial stress in the normal position with elastic elements or by increasing or reducing the load with counter weights.

In some cases it may be desirable to cause the movable roll 6 to change its position actively via a driven moving mechanism instead of passively by the effect of the film web. Such moving mechanism could be controlled by means of force sensors located on the axle heads and operated by a separate regulating and control device.

When the smoothing mechanism 7 consists of more than two smoothing rolls and more than one intermediary slit, at least the intermediary slit which is passed through first by the web has to be in accordance with the design of the present invention. Preferably the following intermediary slits are of the same design as well.

The apparatus of the present invention is suitable for processing all common thermoplastic materials used in film production like thermoplastic polyesters, polyolefines, polyvinyl chloride, polystyrene, polyacrylates, polycarbonates or polysulfonates.

Figure 2:
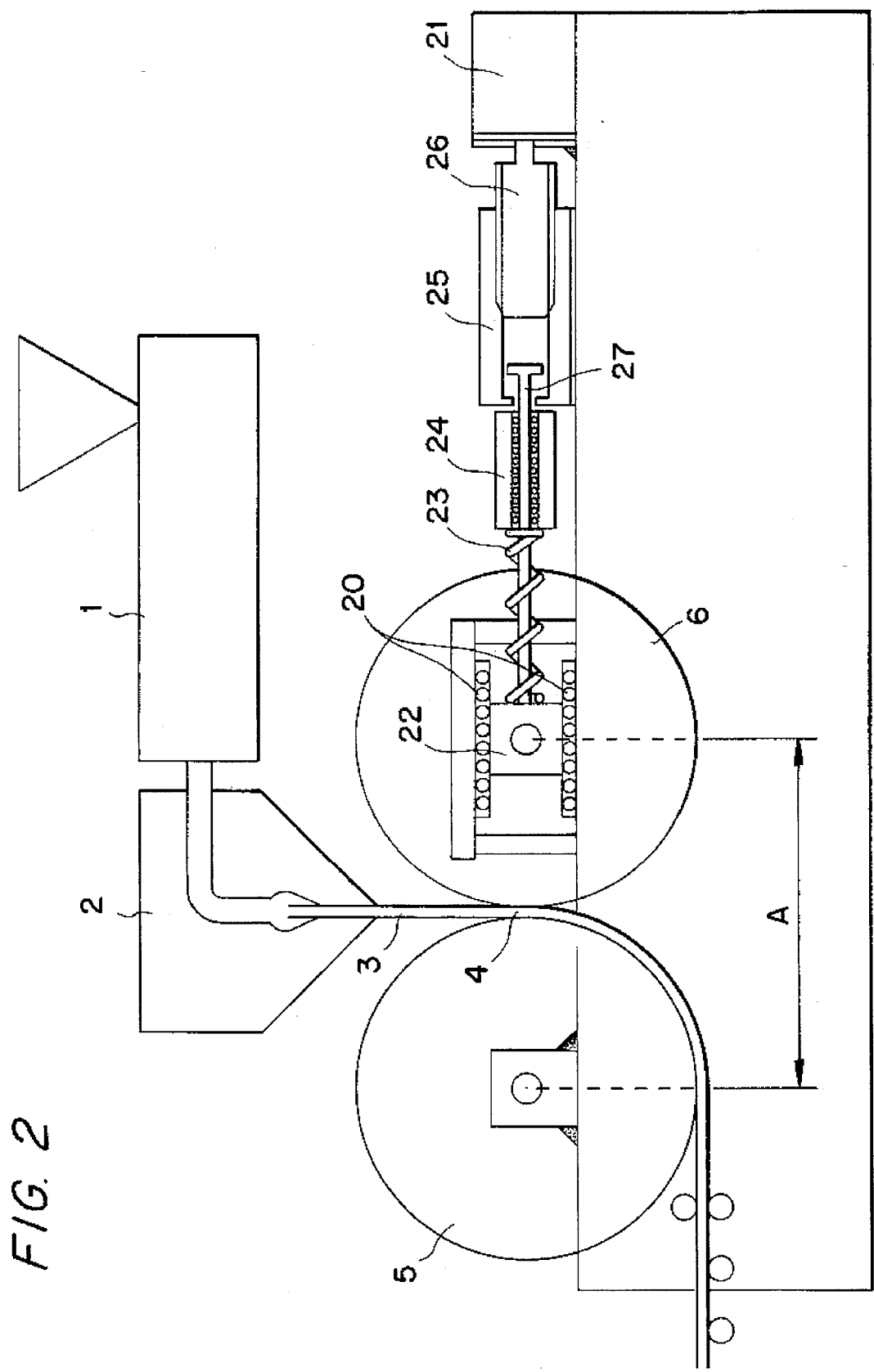
FIG. 2 is a detailed view of another preferred embodiment of an extrusion line according to the invention.

One of the preferred embodiments of a smoothing mechanism according to the present invention is shown in FIG. 2. The smoothing roll 5 is rigidly resting on the side shield of smoothing mechanism 7. The counter roll 6 is movably resting on linear bearings 20 the bearing block 22 of which can be moved into a starting or operating position by the aid of a hydraulic or pneumatic or ram 21 which is rigidly mounted on the side shield of the smoothing mechanism.

By a traction force exerted via links 26, 25, 27 the bearing block 22 is moved into the starting position of the smoothing mechanism in which rolls 5 and 6 are clearly separated from one another. As soon as the front end of extruded film web 3 has been passed through intermediary slit 4 on starting operation, bearing block 22 is caused by a pushing force exerted by punch 21 to move into its operating position. The necessary pressure at the slit is produced by an initial stress of spiral spring 23 the ends of which are acting on bearing block 22 and bearing sleeve 24. The slit pressure can be adjusted by screwing of a locking nut 25 resting on the bearing sleeve and threadedly mounted on a threaded rod 26 fastened to the piston of punch 21.

In case of local thickening in film web 3 during operation, intermediary slit 4 is permitted to open by a relative compression of spiral spring 23. After the thickening has passed through, roll 6 returns to its desired position.

We claim:

1. Apparatus for the extrusion and smoothing of plastic film, comprising:

A) an extruder for extruding thermoplastic material,

B) a film die connected to said extruder for receiving the thermoplastic material extruded therefrom and forming that material int a molten web of substantially uniform thickness, C) a smoothing roll mechanism comprising at least one pair of smoothing rolls forming therebetween an intermediate slit through which the web passes, said smoothing rolls being mounted for rotation about respective parallel axes, at least one of said smoothing rolls being rotatably mounted by anti-friction means and being movable relative to the other of said smoothing rolls in a direction substantially parallel to an imaginary line interconnecting said axes and extending substantially perpendicular to said axes, for varying the size of said slit in a direction perpendicular to said axes, and D) a biasing mechanism biasing said at least one smoothing roll toward the other smoothing roll and being yieldable sufficiently to enable the size of the slit to be continuously determined by the thickness of the web.

2. The apparatus according to claim 1, wherein said yieldable biasing means imposes a substantially constant biasing pressure on said one smoothing roller.

3. The apparatus according to claim 1, wherein said yieldable biasing means imposes on said one smoothing roller a biasing pressure varying by no more than ±20% when a deviation of said size of said slit lies within a predetermined amount from a reference size.

4. The apparatus according to claim 3, wherein said variation range varies by no more than ±5%.

5. The apparatus according to claim 3, wherein said variation range varies by no more than ±2%.

6. The apparatus according to claim 1, wherein said yieldable biasing means imposes a biasing force on said one smoothing roller which does not exceed 100N per each cm of slit length.

7. The apparatus according to claim 1, wherein said yieldable biasing means includes means for adjusting a biasing pressure imposed on said one smoothing roll.

8. The apparatus according to claim 1, wherein each of the smoothing rolls has a mirror finish on its outer periphery.

* * * * *